Figure 1:
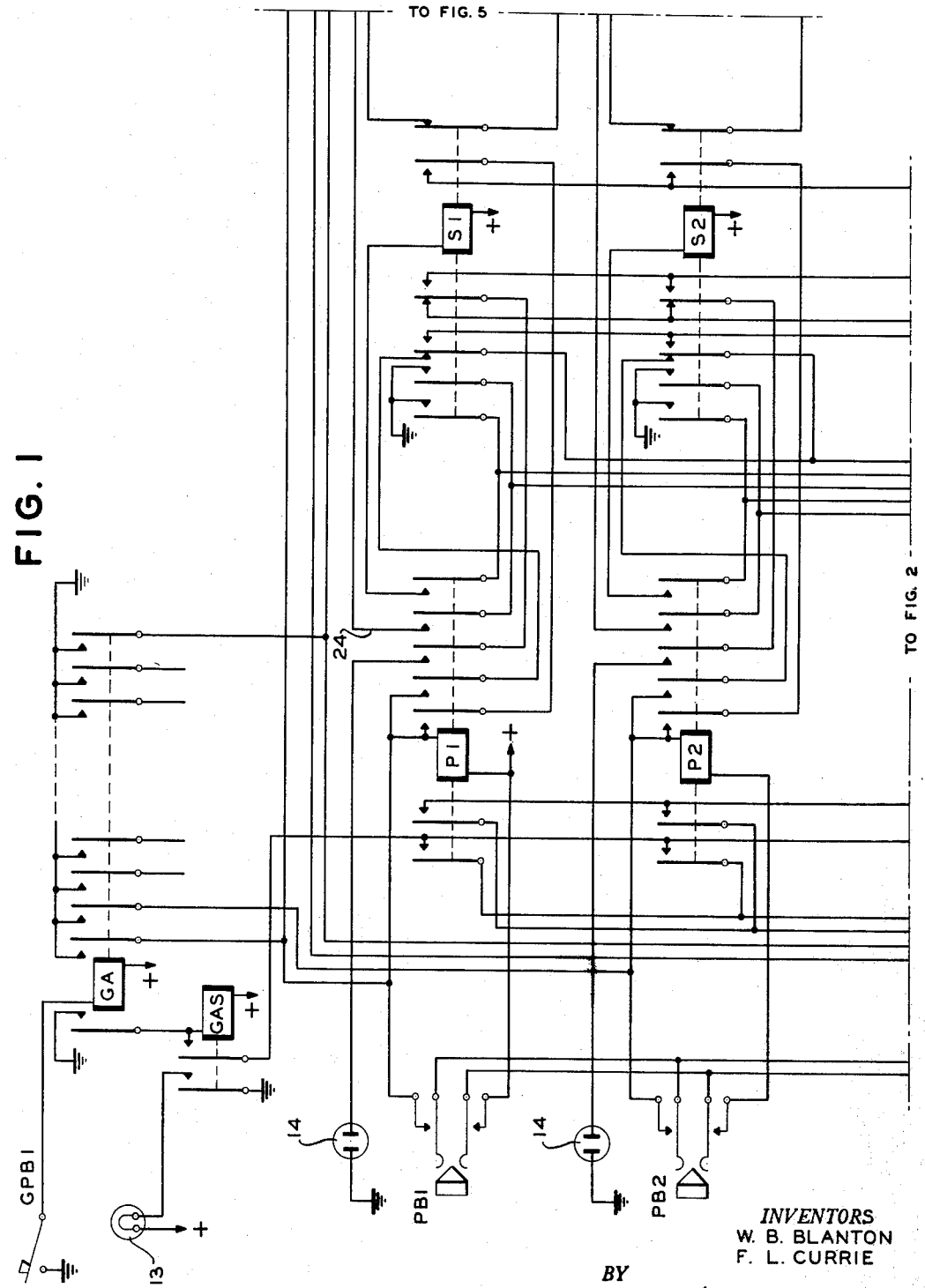

INVENTORS
W. B. BLANTON
F. L. CURRIE
BY
M. R. Marsh
ATTORNEY

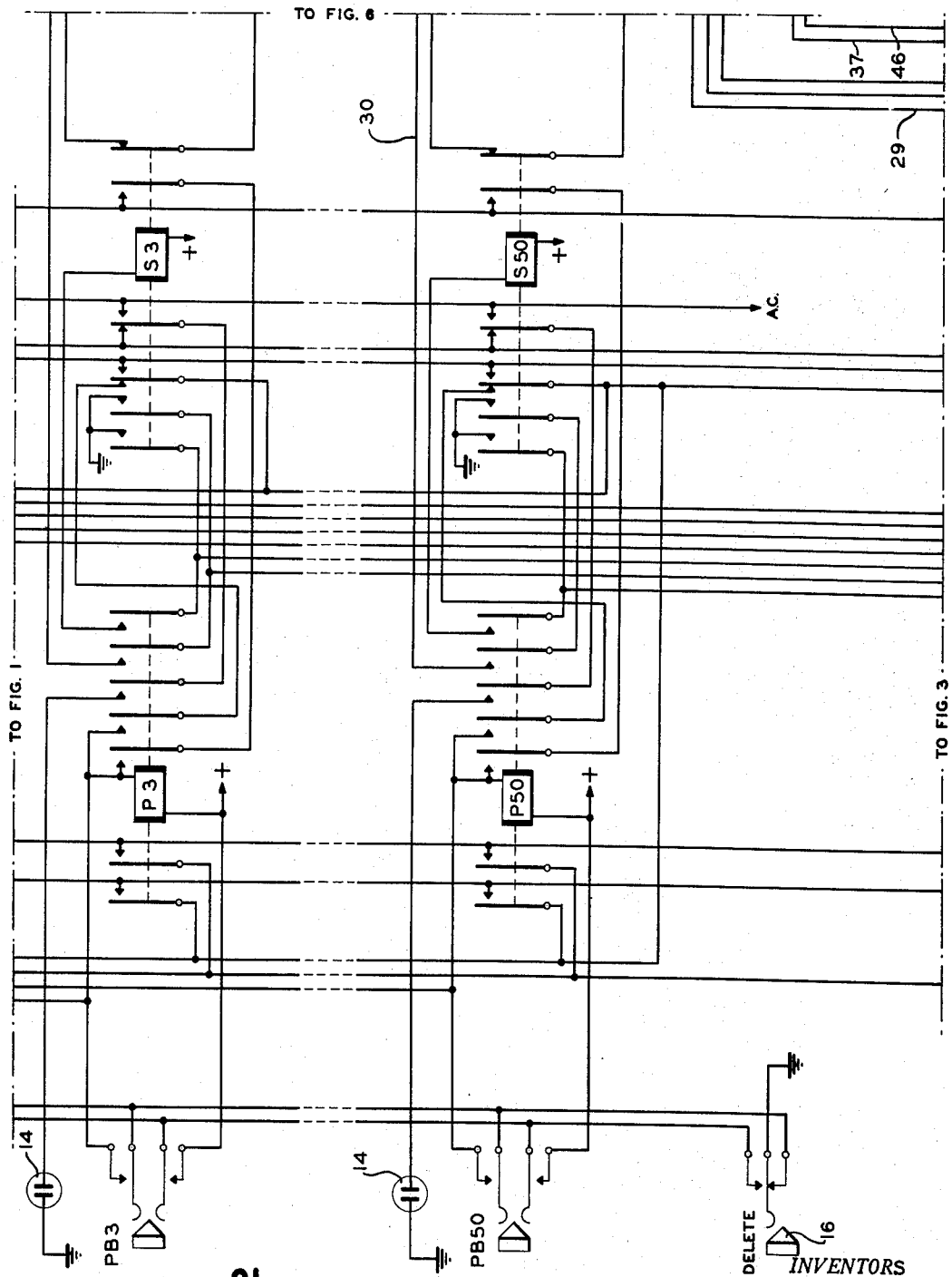

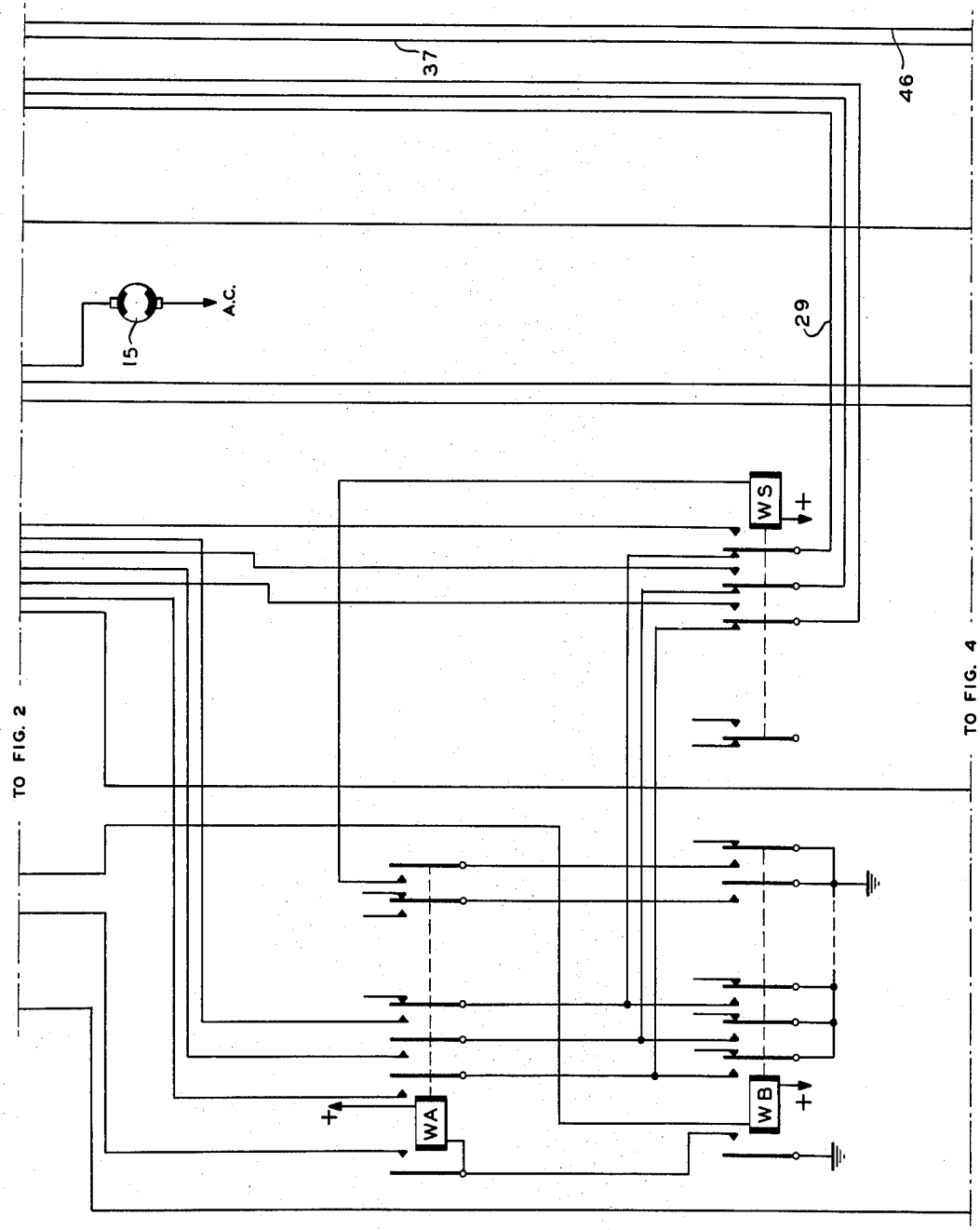

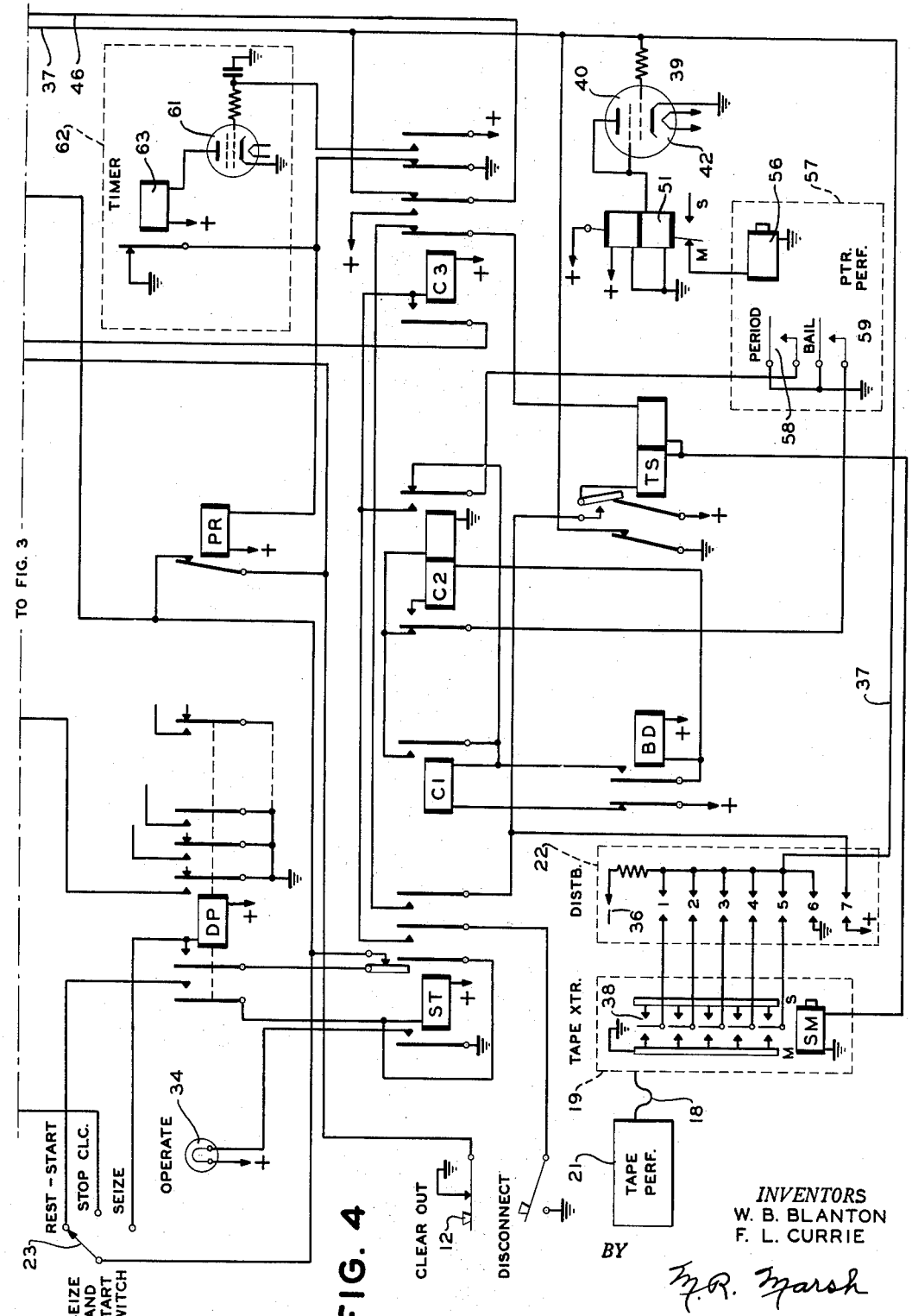

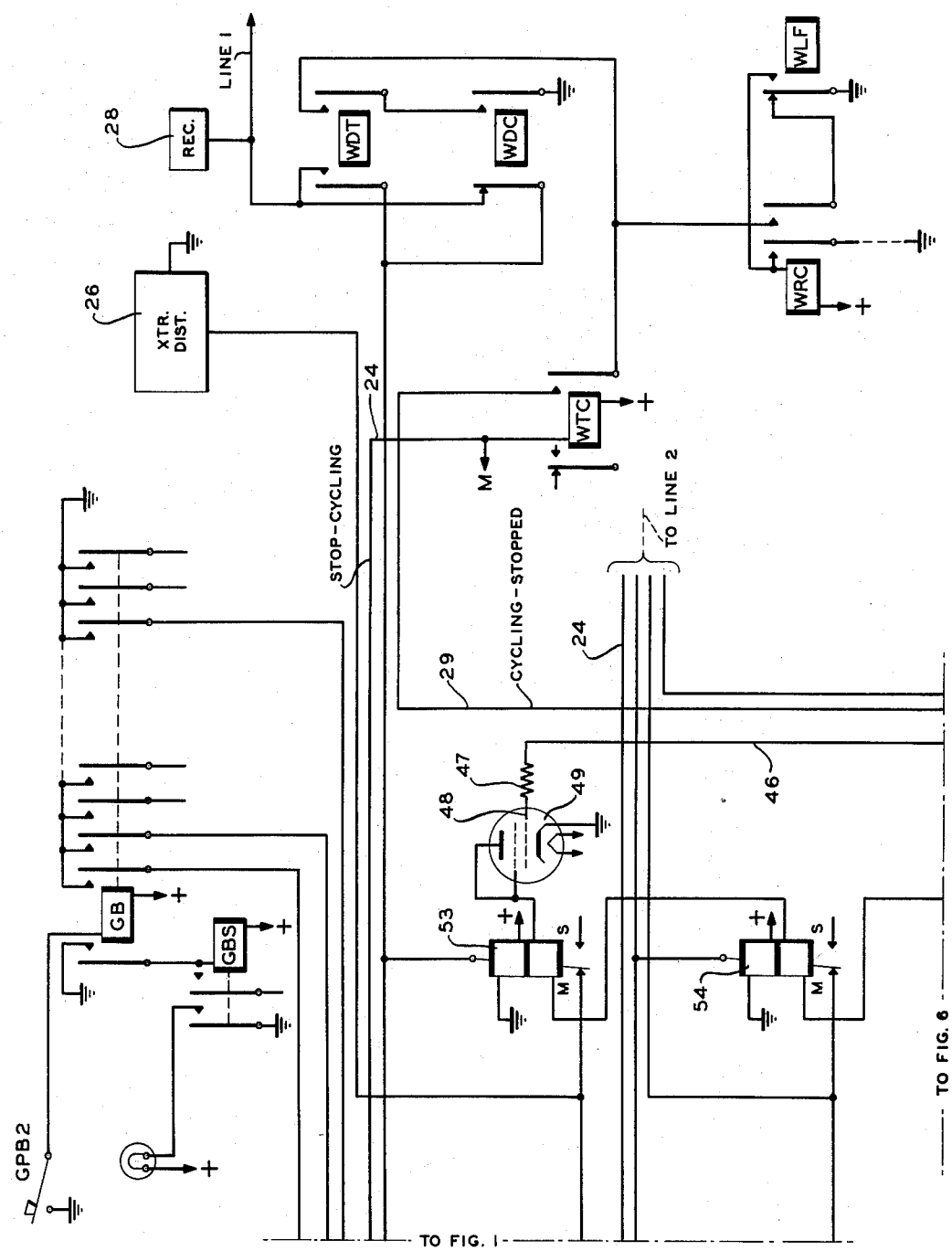

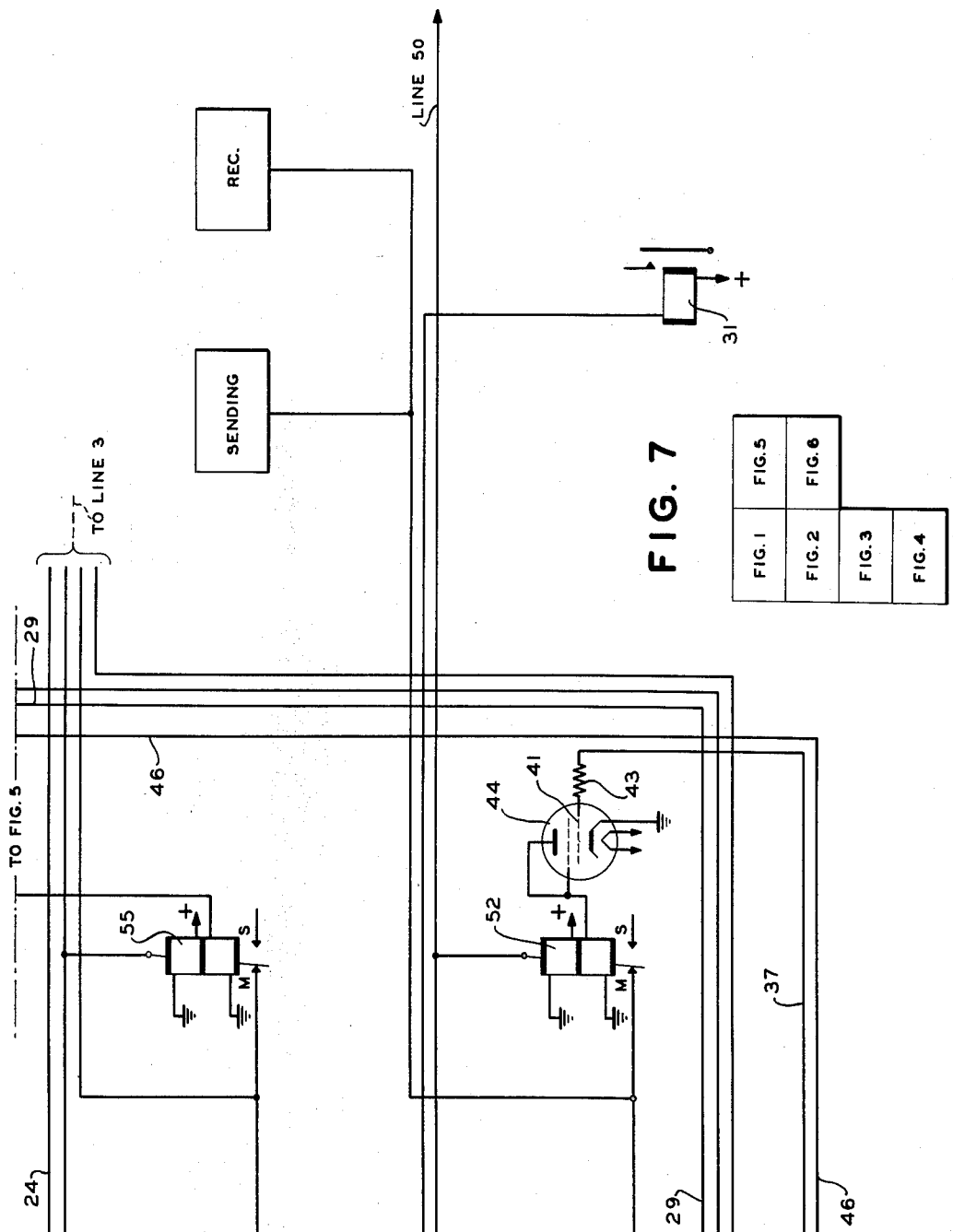

United States Patent Office 2,735,884
Patented Feb. 21, 1956

2,735,884

TELEGRAPH SYSTEM

William B. Blanton, Rockville Centre, N. Y., and Frank L. Currie, Plainfield, N. J., assignors to The Western Union Telegraph Company, New York, N. Y., a corporation of New York Application December 1, 1951, Serial No. 259,356

9 Claims. (Cl. 178—2)

This invention relates primarily to telegraph systems and more particularly to a novel and improved telegraph system and control circuits for simultaneously transmitting news flashes to a selected plurality of outgoing circuits which are normally used for the transmission and/or reception of regular telegraph messages.

Many telegraph subscribers who are associated with a telegraph central office by telegraph circuits for transmission and reception of regular telegraph messages, also subscribe to a non-continuous news service, whereby they receive over their connecting circuits intermittent news flashes. These news flashes are usually rather short and consist mainly of up-to-the-minute reports of prices of various commodities at different intervals such as, for example, reports from various live stock markets, grain markets, cotton markets at specified intervals such as the opening and closing of the markets as well as at other specified times. Some subscribers may desire the quotations of one commodity only a few times a day and those of other commodities as often as they are available, such as every fifteen minutes. Where there are a large number of different markets and a large number of subscribers, each desiring quotations at different times of selected commodities, supplying of these news flashes to the customers becomes a considerable problem. The problem is further complicated by the fact that the various subscribers have different types of telegraph circuits connecting them to the telegraph central office. Some of these circuits may be of the single operated type in that transmission can take place only in one direction at a time and have a plurality of subscribers associated therewith. Such circuits are usually called way-circuits. Other subscribers may be associated with the central office by duplex circuits over which transmission can take place in both directions simultaneously.

It is possible to preempt or seize the sending leg of a duplex circuit at a telegraph central office to transmit a news flash thereover in the middle of a message in the process of being transmitted without losing or mutilating a part of the message and without causing undue confusion at the receiving end of the circuit. However, the seizing of the way-circuits for the transmission of news flashes from the central office is complicated by the fact that the same circuit is used for two-way transmission, one direction at a time, and the circuit can not be seized during the reception of an incoming message without losing a part of the message and causing confusion. Thus, it is desirable to seize the way-circuits only when they are idle or between the transmission of messages.

In view of the above, it is one of the primary objects of the invention to provide a telegraph system and control circuits and equipment therefor, whereby a large number of outgoing circuits can quickly and easily be designated or selected for the transmission of a news flash.

Another object of the present invention is to provide a telegraph system of the above type wherein the lines to which a news flash is to be transmitted are designated or selected in groups.

In the preferred embodiment of the invention, there is an individual selection key or push button for each circuit or channel to which it may be desired to send a news flash. These individual push-buttons permit the individual line circuits or channels to be added to or deleted from a group to which a news flash is to be broadcast. In addition to the individual selecting push buttons, there are a number of group selection push buttons whereby groups of line circuits are simultaneously selected for transmission of a news flash thereto. The different group selection push buttons normally represent different classes of news flashes. For example, one group selection push button may represent the line circuits normally having news flashes pertaining to cotton transmitted thereover whereas another group selection push button may represent the line circuits normally having news flashes pertaining to grain transmitted thereover, and so forth. The groups of circuits represented by the group selection push buttons are selected by depressing these push buttons. An individual circuit may be assigned to more than one group and could thus be selected by the operation of different group selection push buttons.

In operation of the system, the circuits to have the news flash broadcast thereto are selected by the operation of the proper group selection push buttons or the individual line selection push buttons after which a manual three-position rotary switch is actuated to initiate the seizing of the selected circuits and to start transmission of the news flash from the switching center. When the desired circuits have been seized, in the manner hereinafter pointed out in detail, the transmission of the news flash is started and will continue until the end thereof. The end of the news flash is indicated by an end-of-message signal consisting of two periods, and its transmission through the control circuits automatically causes the release of all circuits to which the news flash has been transmitted, whereupon they may be used for the transmission of the normal telegraph messages.

In the drawings Figs. 1 to 6 are a schematic circuit of the invention and Fig. 7 shows how Figs. 1 to 6 are arranged with respect to each other.

Referring now to the drawings, there is shown for the purpose of illustration the control circuits and equipment for enabling a news flash to be simultaneously transmitted to four individual outgoing circuits. These circuits are identified as lines 1, 2, 3 and 50, with the control circuits of lines 1, 2 and 3 being associated with so-called way circuits, or those adapted for one way transmission at a time, and that of line 50 associated with a duplex circuit, or one adapted for two-way transmission simultaneously. Each of the control circuits for the four lines shown has an individual selection push button identified as PB1, PB2, PB3 and PB50, and normally the operation of these push buttons selects the associated lines for the transmission of a news flash thereover. In addition to the individual push buttons there are a number of group selection push buttons, two such push buttons GPB1 and GPB2 being shown in the drawings. The operation of these group selection push buttons simultaneously selects the circuits or lines of a predetermined group for the transmission of the news flash thereover.

In the following description it will be assumed that the group of lines associated with group selection push button GPB1 is to have a news flash transmitted thereover, and in accordance therewith the operator, after determining this fact by the inspection of the news flash, will operate push button GPB1. The operation of this push button completes a circuit for the operation of relay GA, which in operating applies a ground through its right hand tongues to control circuits associated with the various lines in its group. In the arrangement shown, the energization of relay GA causes operation of pattern relays P1, P2 and P50, and these relays lock up through circuits including the front contact of their second right hand tongues, the back contacts and second left hand tongues of associated seize relays S1, S2, etc., to ground through a normally closed clear-out key 12. Thus, when relay GA operates in response to the actuation of the group selection push button GPB1, the pattern relays P1, P2, etc., of the lines associated or included in this group will be operated and locked up. In addition, the operation of relay GA through its left hand tongue completes a circuit for the operation of the group signal relay GAS which locks up by a circuit through its front contact and inner tongue, the front contact and outer left hand tongue of any one of the operated pattern relays P1, P2, etc., to ground at the clear-out key 12. Relay GAS in operating also completes a circuit for illuminating the group signal lamp 13 to indicate that the group of circuits or lines associated with the first group selection push button has been selected. Lamp 13 continues to glow until the end of transmission of the news flash or until the pattern set up is cleared out.

As a pattern relay such as P1 is operated, a circuit is completed for flashing its associated lamp 14. This circuit is from ground through the lamp 14, the front contact and third right hand tongue of relay P1, the inner left hand tongue and back contact of associated seize relay S1, and through a constantly operating circuit interruptor 15 to potential.

It will be noted that in addition to operating the pattern relays P1, P2, etc., in response to the operation of the relay GA, the said pattern relays may be individually operated by the actuation of associated push buttons, such as PB1, PB2, etc. Such individual operating circuits include the two upper springs of the push buttons whereby a circuit from ground normally extending through closed contacts of a delete push button 16 is applied to one terminal of the coils of the pattern relays, the other terminals of which are connected to potential. Accordingly, individual lines not included in the groups selected may be added to those selected by the group push buttons by the actuation of the individual line push buttons PB1 to PB50.

It may be that the group selection push button GPB1 or other similar push buttons have caused the selection of one or more circuits which it is desired to eliminate from the group pattern. If such is the case, the operation of the delete push button 16 removes the ground from the second springs of the line selection push buttons PB1, PB2, etc. and applies this ground to the third springs thereof. Accordingly, with the delete push button 16 held operated, the operation of a line selecting push button such as PB1 extends ground to the battery side of the associated pattern relay such as P1. This ground short-circuits the coil of the pattern relay, whereby the same will release.

It will now be assumed that the operator has selected the desired circuits or set up a pattern of circuits to receive a news flash by operating a group selection push button such as PB1 and/or one or more of the individual circuit selecting push buttons such as PB1, PB2, PB3, etc., and that a perforated tape 18 containing a news flash has been placed in the tape transmitter 19. The perforated tape 18 may be prepared by a suitable perforating mechanism 21, either signal or manually controlled, and the tape transmitter 19 may be of the type well known in the art with a series of fingers for sensing perforations in the tape 18. Co-operating with the tape transmitter 19 is a distributor 22 of the continuously rotating type which causes code groups of signals representing the perforations in the tape to be transmitted to the selected circuits in the manner hereinafter pointed out.

The operator next manipulates a manually operable three-position rotary switch 23 to control the seizing of the selected circuits. The switch 23, called a seize-and-start switch, is normally in its first or "rest-start" position, and when the switch has been moved through the other positions and returned to the first position, it serves to start transmission of the news flash. When in the second or "stop cycling" position, the switch 23 initiates the seizing of the way-circuits by causing operation of way-circuit stop cycling relays and the cycle control relays. In its third or "seize" position, the switch 23 causes operation of preempt relays of the selected duplex circuits whereby if messages are being transmitted over the selected duplex circuits, the circuits are preempted or seized for transmission of the news flash.

With the desired pattern of line circuits set up on the pattern relays as indicated by the energization of the pattern relays P1, P2, etc., the movement of the seize and start switch 23 from its "rest-start" position to the "stop cycling" or second position extends a ground from the clear-out switch 12 through closed contacts of the normally energized PR relay, the movable arm of the switch 23 and its second position contact, the inner left hand tongue and front contact of the operated ones of the pattern relays P1 to P50, and through the coil of the way-circuit cycling control relay WB to potential. Accordingly, relay WB operates and completes a circuit for the operation of the way-circuit "stop cycling" relay WA and relays WB and WA in operating complete a circuit for the operation of the way-circuit seize relay WS. There may be a plurality of WB, WA and WS relays, depending upon the number of circuits selected and the capacity of these relays. When there are more than one of these relays, they may be arranged to operate one from the other in the well-known manner.

When relay WA operates, it locks up by a circuit including the front contact and outer left hand tongue of any one or more of the operated pattern relays to ground at the clear-out switch 12. With both the WA and WB relays operated, a so-called "stop-cycling" ground is applied through front contacts of these relays, the fourth right hand tongue and front contact of operated pattern relays of the way circuits, to "stop-cycling" conductors 24. Each way-station sending position, as shown for line 1 in Fig. 5, includes a transmitter distributor 26 for transmitting regular messages to the line circuit, a receiver 28 for receiving incoming messages over the line, and a set of control relays including relays WTC, WDT, WDC, WRC and WLF, some of the functions of which are hereinafter set forth. The transmitter distributor 26 and receiver 28 are arranged in the usual manner to send and receive messages respectively, either one at a time, and the control relays are adapted to operate in conjunction therewith to control the operation of the equipment associated with the way-circuit. Relay WTC of a way-circuit, for example, is operated at various times in conjunction with the operation of the sending position, and if it is operated at the time ground is applied to the "stop-cycling" conductor 24, it is held operated as long as switch 23 remains in its second position. If relay WTC is unoperated when the "stop-cycling" ground is applied, the ground operates the same. If the sending position is transmitting to the line at the time the "stop-cycling" ground is applied to conductor 24, relay WDC will operate in response to the double period terminating this message and a predetermined length of time thereafter relay WDT will operate by conventional type circuits, not shown. The line circuit is open between the operations of relays WDC and WDT and this open line interval conditions the remote station or stations of the way-circuit for the receipt of a message or news flash from the central office. The operation of relay WDC followed by the operation of relay WDT applies a ground through front contacts thereof and a front contact of relay WTC to the so-called "cycling-stopped" conductor 29. Each way station sending position has a "cycling-stopped" conductor which terminates on a tongue of relay WS, and with relay WS energized, these circuits are extended through front contacts of the operated ones of the pattern relays P1, P2, etc. and through the coils of associated seize relays S1, S2, etc. to potential. The seize relays associated with operated pattern relays are thereby operated and in operating lock up by a circuit through front contacts of associated pattern relays and front contacts of the seize relays.

When a message is incoming to the receiver 28, relay WLF will be operated and other relays not shown apply a ground to the inner tongue of relay WRC. Relay WLF will release in response to the end-of-message signal and apply a ground through the outer tongue and front contact of relay WRC and the tongue and front contact of relay WTC to the "cycling-stopped" conductor 29 to initiate as above set forth the operation of the seize relays, such as S1 of the selected way circuits. The operation of a seize relay, such as S1, performs a number of functions including the transfer of the circuit to the associated lamp 14 from the flashing source 15 to steady potential whereby the lamp 14 is caused to glow steadily and thereby inform the operator that the respective circuit has been seized.

Thus when the "seize and start" switch 23 is moved to its second position, the idle ones of the way circuits are seized immediately and the busy ones seized as they become idle during the time switch 23 is in this position. The operator may wait a reasonable length of time for the busy way circuits to become idle and be seized as indicated by the lamps 14 and then move the switch 23 to the third or "seize" position. Such movement of the switch 23 causes relays WB to release which in turn releases relay WS. The release of relay WB removes ground from the "stop-cycling" conductors 24 of the selected way circuits that were not seized due to the busy condition thereof. The ground for holding the "cycling-stopped" on the way circuits that were seized is applied through front contacts of associated seized relays such as S1. The removal of the "stop-cycling" ground from the way circuit that were not seized returns these circuits to normal. The release of relay WS connects the "cycling-stopped" circuit 29 to the "stop-cycling" circuit 24 so that if a "cycling-stopped" ground is returned from the way circuit sending position, it will be applied to the "stop-cycling" circuit thereof to hold this way circuit in condition to be seized on the next attempt.

When the switch 23 is moved to the third or "seize" position, ground on the movable arm thereof is applied through the coil of relay DP to operate the same. Relay DP in operating prepares a circuit for the operation of start relay ST when the arm of switch 23 is returned to its first or "rest-start" position. The operation of relay DP also applies a ground for the operation of the seize relays such as S50 of the selected duplex lines which in operating initiates the same functions as the way circuit seize relays except that of the "stop-cycling" function. A duplex seize relay, such as S50, in operating applies a ground to a "stop-sending" lead 30 to cause operation of a relay 31, Fig. 6, at the duplex line sending position. The operation of relay 31 in the well-known manner stops further sending to the line from the duplex sending position and thereby preempts the duplex line circuit such as 50. Thus, the selected duplex line circuits such as 50 are immediately seized when the switch 23 is moved into its third position regardless of the busy or idle condition of the sending leg thereof.

Following the seizure of the duplex lines, the operator next returns the "rest-start" switch 23 to its second position. In this position, a second attempt will be made to seize any of the selected way circuits that were not seized when the switch 23 was first operated to its second or "stop-cycling" position. On the movement of the switch 23 to this position, relays WA, WB, WS will again operate and the seize relays such as S1 of the selected but unseized way circuits will be given another chance to operate as above described. The operator may again wait a short interval of time with the switch in this position to permit busy way circuits to become idle and to be seized. However, if all of the desired or selected way circuits are not seized at this time, the operator may transmit the news flash to the seized way circuits and the duplex circuits and some time thereafter make another attempt to seize the selected way circuits that did not have the news flash transmitted thereto.

It will now be assumed that the operator waited a reasonable length of time to permit the way circuits to be seized during the second attempt and then operated the "seize and start" switch 13 to its No. 1 or "rest-start" position. When the switch 23 is in its second position, relays WA, WB and WS will be operated and relays WB and WS will release as the switch 23 leaves this position which movement of the switch 23 also completes a circuit for the operation of the start relay ST. This circuit extends from ground through the clearout key 12, contacts of the normally energized relay PR, the switch arm and "rest-start" or first contact of switch 23, a front contact and tongue of operated relay DP and the coil of relay ST to potential. Relay ST in operating locks up by a circuit including its inner right hand tongue and the inner left hand tongue of relay DP. The start relay through its inner right hand tongue completes the locking circuit before the operating circuit therof is opened by the release of relay DP. Relay ST also causes the operate lamp 34 to be illuminated so as to indicate that the multi-send circuit is set up to transmit. Lamp 34 is lighted for the duration of the transmission.

The operation of the start relay ST completes a circuit from the No. 7 or step pulse contacts of the continuously operating distributor 22 through a front contact of relay ST, a back contact and tongue of relay C3 and the right hand coil of relay TS to the circuit of the step magnet SM of the tape transmitter 19. Accordingly, the next closure of the step pulse contacts of the distributor 22 causes current to flow through the right hand coil of relay TS in a direction opposite to that flowing through the inner tongue and left hand coil thereof, whereby relay TS is caused to release when the step pulse contacts subsequently open. Release of relay TS and the opening of the step pulse contacts removes the steady battery heretofore applied through the left hand coil of relay TS to the transmitter step magnet SM whereby the same is conditioned to respond to further step pulses from the distributor 22 and advance the tap 18 one step in conjunction with each energization thereof. The release of relay TS through its outer tongue removes the shorting ground from the distributor transmitting battery 36 and the sequential closing of the Nos. 1 to 5 contacts of the distributor cause a group of five intelligent impulses to be applied to conductor 37 in accordance with the positions of the tongues 38 of transmitter 19. The tongues 38 of transmitter are operated in accordance with the perforations in the tape 18 to apply ground selectively to associated contacts 1 to 5 in the distributor and the impulses transmitted from the distributor to conducor 37 will, accordingly, be permuted groups of potential or no potential. Each group of impulses is accompanied by a no-potential impulse when the No. 6 contacts of the distributor close.

Conductor 37 extends through a resistance 39 to the grid 40 of a vacuum tube 42 in parallel with a resistance 43 extending to the grid 41 of another vacuum tube 44. Another parallel connection from the conductor 37 extends to the back contact of the second right hand tongue of relay C3. This tongue is connected by a conductor 46 through a resistance 47 to the grid 48 of a vacuum tube 49. Accordingly, the pulses transmitted from the distributor 22 are applied to the grids 40 and 41 of vacuum tubes 42 and 44 and with relay C3 deenergized, the pulses are also applied to the grid 48 of vacuum tube 49. Vacuum tube 42 has a polar relay 51 connected in the plate circuit thereof which operates in accordance with the signals applied to the grid 40. Likewise, a polar relay 52 in the plate circuit of vacuum tube 44 operates in accordance with the signals applied to the grid 41 thereof. In the plate circuit of vacuum tube 49 are three polar relays 53, 54 and 55 which operate in accordance with the signals applied to the grid of vacuum tube 49. Each vacuum tube may be arranged to operate a number of polar relays and there may be other vacuum tubes with associated sets of polar relays. A polar relay is associated with each of the lines or circuits the system is adapted to operate in conjunction with, and in the arrangement shown polar relay 52 is associated with the duplex line 50 and polar relays 53, 54 and 55 are associated with way circuit lines 1, 2 and 3, respectively.

The polar relay 51 is arranged to transmit to the selector magnet 56 of a printer-perforator 57 whereby it records on its tape the message sent by the transmitter 19. The signal impulses transmitted from the distributor 22 will continue to be sent to the seized lines and to be recorded on the local printer-perforator 57 until the reception of the end-of-message signal which consists of two period codes perforated in the tape 18. It will be noted that the outer right hand tongues and back contacts of the size relays are connected around the tongue and marking contact of the polar relays 52—54 and hence only the lines with operated seize relays will have the signal from the transmitter 19 transmitted thereover.

When the code representing a period is sent to the various seized lines it also causes the period contacts 58 on the printer-perforator 57 to close and complete a circuit from ground through the right hand tongue and back contact of relay C2, the coil of relay C1 and the back contact and outer tongue of relay BD to potential. Relay C1 is operated by this circuit which locks up to ground through its tongue and front contact and the right hand coil of relay C2 in parallel with a circuit through the back contact and left hand tongue of relay C2 and the closed bail contacts 59 of the printer-perforator. When contacts 58 and 59 open, relay C2 will operate by a circuit through its right hand winding and the closed contacts of relay C1.

If the next character received on the printer-perforator 57 is not a period character, the bail contacts 59 which close on each cycle of operation of the printer-perforator, will apply a ground through the left hand tongue, front contact and left hand coil of relay C2 and the coil of relay BD to potential. This circuit holds relay C2 operated and causes operation of relay BD which through its inner tongue and front contact maintains a circuit through the right hand coil of relay C2. Relay BD in operating also opens the circuit through the coil of relay C1 which releases and removes battery from the right hand coil of relay C2. The subsequent opening of the bail contacts 59 causes relay BD to release which in turn releases C2 and the circuits associated therewith are returned to their normal condition.

When a second period follows a first period, the closure of the period contacts 58 the second time will extend the ground thereat through the right hand tongue and front contact of relay C2 and the coil of relay C3 to potential. Relay C3 thereupon operates and relays C1, C2 and BD will release when the bale contacts 59 open as above described. Relay C3 in operating locks by a circuit through its left hand tongue and the front contact and second left hand tongue of one of the operated seize relays S1 to S50. Relay C3 also opens the circuit through the right hand coil of relay TS so that the next step pulse from the distributor passes through only the left hand coil of this relay causing it to operate. Relay TS in operating transfers the stepping circuit of the transmitter from the No. 7 contacts of the distributor to steady battery which stops the transmitter and locks relay TS in an energized condition. Relay C3 through its outer right hand tongue applies potential to the control grid of a vacuum tube 61 included in a timer 62, and after a predetermined length of time tube 61 causes operation of relay 63. Relay 63 in operating removes ground from the circuit to the power relay PR whereupon it releases. Relay PR in releasing removes ground from the arm of the seize and start switch 23 and from the front contacts of the right hand tongues of the seize relays S1 to S50. The removal of ground from the arm of the seize and start switch 23 causes relay ST to release and extinguish the operate lamp 34 and the removal of ground from the front contacts of the inner right hand tongues of the operated one of the seize relays opens the locking circuits for the associated pattern relays P1 to P50 whereupon the associated ones of these relays release.

Thus, the pattern and seize relays associated with the lines to which the news flash was transmitted are restored to their unoperated condition by the end-of-message signal terminating the news flash. Since the selected duplex circuits are seized, regardless of the busy or idle condition of the sending leg thereof all the duplex circuits will have the news flash transmitted thereto, whereas the busy way circuits that did not become idle will not have the news flash transmitted thereto. The pattern relays of the selected way circuits that were busy and not seized will remain energized and the operator may reset the tape in the transmitter and again operate the "seize and start" switch 23 through its three positions to again attempt the seizure of the way circuits associated with the operated pattern relays.

If a second news flash is received at the central office before the preceding one can be transmitted a second time to the way circuits that were busy on the first transmission thereof, and if the second news flash is destined for circuits which may not include some of the way circuits to which the first news flash had not been transmitted, the operation of the clear-out key 12 releases all the operated pattern relays. Accordingly, the operator may, through the operation of the appropriate group selection push buttons and individual line selection push buttons such as GPB1 and PB1, select the desired circuits for the second news flash.

It will be obvious to those skilled in the art that various modifications in the circuits and arrangements described herein may be made without departing from the spirit or essential attributes of the invention and it is desired, therefore, that only such limitations be placed thereon as are specifically set forth in the appended claims.

What is claimed is:

1. In a telegraph system for the simultaneous transmission of messages from a central office to a selected plurality of outgoing lines, means including a manually operable element individual to each line and normally operative to select the line and add it to the group to which a message is to be transmitted, another manually operable element common to all of said lines and means operative with said last mentioned common element operated to remove a selected line from a group on the operation of its manually operable element.

2. In a telegraph system, a central office and a plurality of remote offices, line circuits connecting said central office to said remote offices, means at said central office including manually operable elements individual to each line for selectively selecting desired ones of said lines for the simultaneous transmission of a message thereover, a manually operable control switch having a normal and a first and a second off-normal position, means operative with said switch in said first off-normal position to seize predetermined ones of said selected lines if and/or as predetermined conditions exist thereon, means operative with said switch in said second off-normal position to substantially immediately seize other predetermined ones of said selected lines and means operative thereafter on movement of said switch to said normal position to initiate transmission to the seized lines.

3. In a telegraph system, a central office having a plurality of line circuits connected thereto, a telegraph transmitter, individual manually operable means for simultaneously selecting groups of said line circuits for transmission from said transmitter, and other manually operable means, one individual to each line circuit, for adding individual lines to the selected ones for transmission from said transmitter.

4. In a telegraph system, a central office and a plurality of remote offices, circuits connecting said central office to said remote offices, a transmitter at said central office, manually operable means at said central office for selecting one at time and/or in groups desired ones of said circuits for the simultaneous transmission of a message thereover from said transmitter, means operative after the selection of a circuit for seizing the same if idle and/or when it becomes idle, means for initiating the simultaneous transmission of a message to the seized circuits and means for holding the unseized ones of said selected circuits in a seizable condition as they become idle during the transmission of the message.

5. In a telegraph system, a central office having a plurality of transmission circuits connected thereto normally used for the transmission and reception of messages, a transmitter at said central office, a plurality of manually operable elements some individual to individual transmission circuits and others common to predetermined groups of said transmission circuits for establishing a selected pattern of said circuits for the simultaneous transmission of the same message thereto from said transmitter, another manually operable means common to all of said transmission circuits and operative thereafter to seize the selected circuits if idle and subsequently initiating the transmission of a message thereto and means controlled by the message transmitted for releasing the seized circuits to which the message was transmitted and removing the same from the established pattern of circuits.

6. In a telegraph system, a central office having a plurality of transmission circuits connected thereto normally used for the transmission and reception of messages, a plurality of manually operable elements some individual to individual transmission circuits and others common to predetermined groups of said transmission circuits, means for establishing a selected pattern of said circuits for the simultaneous transmission of a message thereto, another manually operable means common to all of said transmission circuits and operative thereafter to seize the selected circuits if idle and subsequently initiating the transmission of a message thereto, a first means controlled by an end-of-message signal for releasing only the seized circuits to which a message was transmitted and removing the same from the established pattern and a manually controlled means for releasing only the seized circuits to which a message was transmitted and removing the same from the established pattern.

7. In a telegraph system, a plurality of lines extending from a central office, a transmitter at said central office, means for establishing a pattern of said lines for the simultaneous transmission of a message from said transmitter, said means including a push button individual to each of said lines and other push buttons common to groups of said lines, said individual push buttons being operative to add its respective line to the pattern and said other push buttons being operative to add groups of lines to the pattern, line seizing means for seizing the lines of said pattern, said seizing means being operative only when a predetermined condition exists on said lines, manually operative means for initiating the transmission from said transmitter to the seized lines and means operative after an attempt to seize a line to hold the same in a seizable condition if and when said predetermined condition exists thereon.

8. In a telegraph system, a central office and a plurality of remote offices, circuits connecting said central office to said remote office, a plurality of manually operable means at said central office for selecting desired ones of said circuits for the simultaneous transmission of the same message thereover, said means including some elements individual to each circuit and other elements common to selected groups of said circuits, a manually controlled means operative following the selection of a group of said circuits for simultaneously seizing idle ones thereof and to condition the busy ones for seizure as they become idle, means for initiating the simultaneous transmission of the same message to the seized circuits, means for holding the unseized ones of the selected group in a seizable condition as they become idle during the transmission of the message and means for releasing the circuits held in a seizable condition.

9. In a telegraph system, a central office having a plurality of transmission circuits connected thereto normally used for the transmission and reception of messages, an individual signal lamp for each of said circuits, manually operable means for establishing a selected pattern of said circuits for the simultaneous transmission of a message thereto, means operative therewith to cause the signal lamps of the selected circuits to flash intermittently, another manually operable means operative thereafter to seize the selected circuits if idle and subsequently initiating the transmission of a message thereto, means operative on the seizing of selected circuits to cause associated signal lamps to glow steadily, a first means controlled by an end-of-message signal for releasing only the seized circuits to which a message was transmitted and removing the same from the established patterns and means for extinguishing the signal lamps of the circuits removed from the pattern.

References Cited in the file of this patent

UNITED STATES PATENTS

| | | |
|---|---|---|
| 2,271,305 | Mullerheim | Jan. 27, 1942 |
| 2,346,173 | Light | Apr. 11, 1944 |
| 2,486,699 | Bacon | Nov. 1, 1949 |
| 2,546,627 | Blianton | Mar. 27, 1951 |
| 2,546,630 | Currie | Mar. 27, 1951 |
| 2,572,831 | Bacon | Oct. 30, 1951 |
| 2,584,736 | Perry | Feb. 5, 1952 |